Feb. 17, 1970    A. J. JANIK    3,495,483
REVERSIBLE PIPE REAMER
Filed March 29, 1967
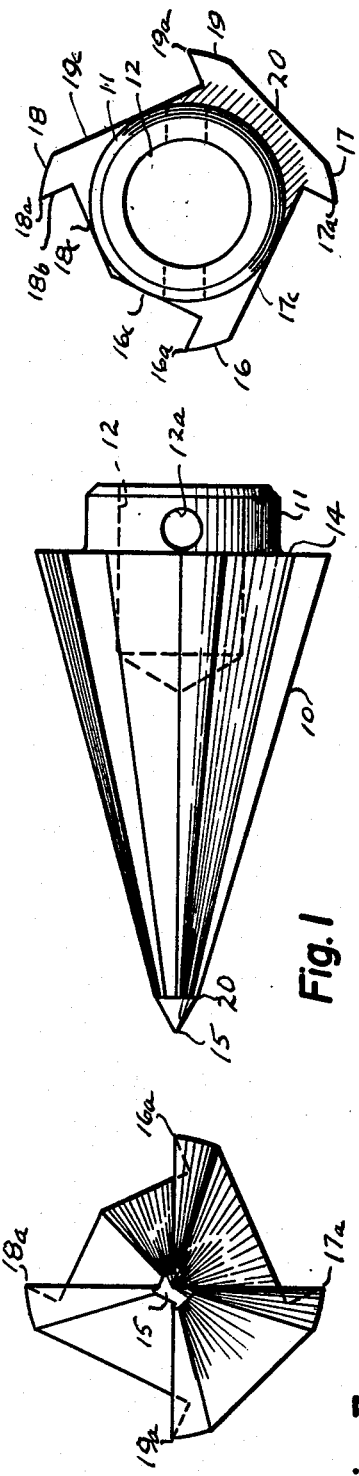
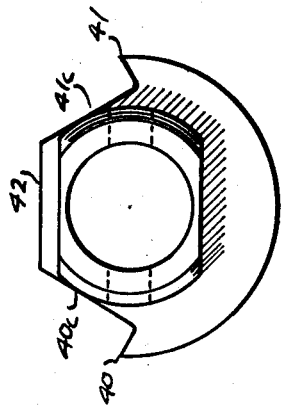
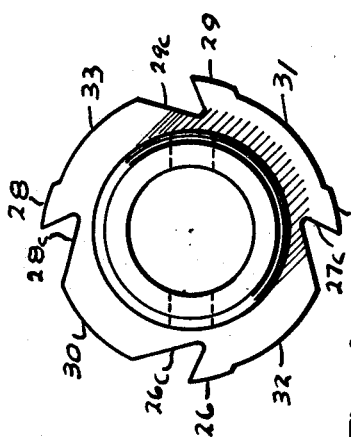
INVENTOR.
ANTON J. JANIK

3,495,483
REVERSIBLE PIPE REAMER
Anton J. Janik, Elyria, Ohio, assignor to Emerson Electric Co., St. Louis, Mo., a corporation of Missouri
Filed Mar. 29, 1967, Ser. No. 626,776
Int. Cl. B23d 79/04; B23b 51/00
U.S. Cl. 77—73     1 Claim

ABSTRACT OF THE DISCLOSURE

A tapered body has at least two longitudinally extending cutting edges thereon facing in opposite directions to each other. There may be more, and preferably are four, such edges. When there are four edges they are less than 180° apart, preferably 90°, and the edges on one side face in one direction and those on the other side in the opposite direction. During a reaming operation the non-cutting edges furnish a support against the opposite side of the pipe for the cutting edges.

---

This invention relates to reversible pipe reamers.

As is well known to those versed in the art, it is desirable and customary to ream the end of a pipe after it has been cut to remove the burr or flash left by the cutting tool. Heretofore it has been common practice to provide reamers which, in order that different sizes of pipes could be reamed, included tapered body portions having one or more cutting blades with cutting edges which engaged with and removed the burr. When more than one cutting blade was used they always faced in the same direction, as shown in Patent 2,458,681, and therefore the reamer or the pipe had to always be turned in the same direction. Usually when hand reamers were used, they were turned by a ratchet type of handle, such as shown in Patent 2,004,639. This required the operator to make sure that the ratchet was set to turn in the right direction.

In the case of reamers for pipe machines, such as shown in Patent 2,768,550, when the pipe was rotated, it was frequently necessary to stop and reverse the machine in order that the pipe be turning in the right direction for the reamer to operate. In both of the above instances, the determination of direction was time consuming.

In addition to the above, such reamers frequently left a short and sharp spike at the place where the blades stopped when the reaming operation was finished.

The present invention contemplates a pipe reamer which will ream the end of a pipe regardless of the direction in which it is turned. The design is such that the reamer is steadied by guiding portions which engage with the pipe diametrically opposite to the cutting edges, thus eliminating chatter and providing a smooth cutting operation. When the reaming is completed, if desired, a quarter turn of the reamer in the other direction will remove the spikes left by the cutting edges.

Still other advantages of the invention and the invention itself will become more apparent from the following description of some embodiments thereof which are illustrated by the accompanying drawings and form a part of this specification.

In the drawings:

FIG. 1 is an elevational view of the reamer of the invention;

FIG. 2 is an end view from the base end;

FIG. 3 is a view from the other end; and

FIGS. 4 and 5 are cross-sectional profile views of modifications thereof.

Referring to the drawings, throughout which like parts have been designated by like reference characters and particularly to FIG. 1, a preferred embodiment of the invention is illustrated and includes a tapered body 10, one end of which is provided with a circular boss 11 having a bore 12 whereby it may be disposed on a suitable holding shaft, being held thereon by a pin extending through a hole 12a in the boss and through the shaft, not shown, such as shown in the pipe machine Patent No. 2,768,550. It is apparent that a ratchet head could be secured on the base of the reamer, particularly when it is to be used with a ratchet and handle for hand reaming. In addition, a simple "T" handle could be used, if desired.

The body 10 tapers from the base end 14 to a point 15. Spaced about the periphery of the tapered body are a plurality of longitudinally extending lands 16, 17, 18 and 19. The lands each have cutting edges 16a through 19a. Each cutting edge is spaced 90° from the adjacent cutting edge, the edges 16a–17a being arranged to cut in one direction and the edges 18a–19a to cut in the opposite direction when the reamer is turned.

The lands taper in thickness from the base 14 toward the point 15, preferably stopping at a place 20 spaced from the point, the remainder of the body being ground to a point including an angle greater than that included by the main body which supports the lands.

The surface of the lands back of the cutting edge may be substantially an arc determined by a radius from the axis of the reamer, although a slight relief is provided, that is the cutting edges are slightly higher than the trailing portions of the lands. The forward faces as indicated at 18b, are undercut approximately 25°. It will be appreciated that the amount of relief of the periphery of the blades from the cutting edge to the trailing edge may vary as well as the amount of undercut of the forward faces.

The design particularly lends itself to simple machining operations. The tapered body is first formed and the boss 11 faced and bore 12 drilled to provide a means for holding it on a suitable fixture. The faces between the cutting edges may then be milled or broached to provide the surfaces 17c and 19c, the material from the cone being removed to provide the cutting edges 17a and 19a. Then the surfaces 16c and 18c are milled to provide the cutting edges 16a and 18a, after which the surface 20 may be milled. Substantially the remaining periphery of the lands may be ground to provide the desired contour and relief for the lands as previously described.

It is apparent, therefore, that considerable economy in manufacture may be realized because of the simplified machining operation. Although a certain sequence of operations has been described, the invention is not limited to such a sequence.

In operation, the device is inserted into the end of a pipe which is to be reamed and rotated in either direction. If it is rotated clockwise, as viewed in FIG. 2, the edges 16a and 17a will do the cutting. At the same time the arcuate surfaces of the lands 18 and 19 will bear against the opposite side of the pipe diametrically opposite to the cutting edges 16a–17a. They will move smoothly around the edge of the pipe and hold the opposite cutting edges steady, particularly after one complete revolution of the tool during which the cutting edges have removed the irregularities from the surface.

When the desired amount of material is removed from the inner edge of the pipe, should there be any sharp spikes left by the cutting edges, a slightly more than 90 degree revolution in the opposite direction under light pressure will cause these spikes to be removed.

Inasmuch as the edges 16a–17a face in one direction and the edges 18a–19a face in the other direction, the direction of rotation is unimportant because it cuts either way. When used on a pipe machine, in particular, it is not necessary to stop and reverse the motor. When used with a ratchet handle it is not necessary to set the ratchet for a specific direction.

FIG. 4 illustrates another embodiment which in substance enables the same reaming operation to be performed. In this instance, the lands 26 through 29 correspond to the lands 16 through 19 of FIG 2, the difference being that the cone is broached, milled or ground at 26c through 29c in a different manner and the material of the cone at 30 through 33 is only removed sufficiently to provide a clearance for the cutting edges.

FIG. 5 is still another embodiment of the invention where only two cutting edges 40–41 are provided. In this instance the cone is milled at 40c, 41c and 42, the machining at 40c and 41c providing the cutting edges. This provides a device which may be made cheaper due to the reduced number of machining operations.

One particular advantage of the present reamer resides in the fact that when it is used by hand with the usual ratchet handle, the ratcheting is more easily obtained because the blades opposite the cutting blades hold the reamer against turning in the wrong direction. Thus, less endwise pressure is needed to effect reaming and there is less tendency of the blades to "gouge" into the pipe When used with a T handle, the reaming can be effected without changing the grip by rotating the handle through slightly over 90° in opposite directions.

Having thus described the invention in some embodiments thereof, I am aware that numerous and extensive departures may be made therefrom without departing from the spirit or scope of the invention as defined in the appended claims.

I claim:
1. A reversible pipe reamer comprising a solid tapered body, four cutting blades on said body and extending substantially throughout the length thereof, each of said cutting blades being longitudinally extending tapered lands with one edge of each land formed with a cutting edge and the surface behind said cutting edge being formed for bearing stabilizing engagement with a work piece, said blades at diametrically opposite positions being formed one for cutting engagement with a work piece and the other stabilizing non-cutting bearing engagement with the work piece, those of said blades on one side of a diametrical center line being arranged for cutting engagement with the work piece in one direction and those of said blades on the other side of said line arranged for non-cutting stabilizing engagement with a work piece.

References Cited

UNITED STATES PATENTS

| | | | |
|---|---|---|---|
| 1,228,951 | 6/1917 | Morton | 77—73 |
| 3,020,787 | 2/1962 | Cusik | 77—73 |
| 644,595 | 3/1900 | Grabler | 77—73 |

FRANCIS S. HUSAR, Primary Examiner

U.S. Cl. X.R.

77—72; 145—114